(12) United States Patent
Yoon et al.

(10) Patent No.: US 8,358,305 B2
(45) Date of Patent: Jan. 22, 2013

(54) METHOD FOR 3D PREPROCESSING FOR RAY TRACING

(75) Inventors: Young-Keun Yoon, Chungbuk (KR); Jong-Ho Kim, Daejeon (KR); Heon-Jin Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 241 days.

(21) Appl. No.: 12/834,995

(22) Filed: Jul. 13, 2010

(65) Prior Publication Data

US 2011/0102420 A1 May 5, 2011

(30) Foreign Application Priority Data

Oct. 29, 2009 (KR) ........................ 10-2009-0103437

(51) Int. Cl.
*G06T 15/50* (2011.01)
(52) U.S. Cl. ........ 345/426; 345/419; 345/421; 345/424; 345/581
(58) Field of Classification Search .................... 375/242
See application file for complete search history.

(56) References Cited

U.S. PATENT DOCUMENTS

| | | | | |
|---|---|---|---|---|
| 6,785,547 | B1 * | 8/2004 | Heiska et al. ................ | 455/446 |
| 7,577,436 | B2 * | 8/2009 | Ebata ........................... | 455/446 |
| 7,634,265 | B2 * | 12/2009 | Sugahara et al. ............ | 455/423 |
| 2003/0064733 | A1 * | 4/2003 | Okanoue et al. ............ | 455/456 |
| 2005/0100102 | A1 * | 5/2005 | Gazdzinski et al. ......... | 375/242 |
| 2008/0161005 | A1 * | 7/2008 | Sato et al. .................... | 455/446 |
| 2010/0007552 | A1 * | 1/2010 | Oda et al. ................ | 342/357.09 |
| 2011/0044508 | A1 * | 2/2011 | Yoon et al. ................... | 382/103 |
| 2011/0153294 | A1 * | 6/2011 | Yoon et al. ...................... | 703/6 |

FOREIGN PATENT DOCUMENTS

KR 1998-052396 9/1998
KR 2007-0034205 3/2007

OTHER PUBLICATIONS

Aguado Agelet, F.; Formella, A.; Hernando Rabanos, J.M.; Isasi de Vicente, F.; Perez Fontan, F.; , "Efficient ray-tracing acceleration techniques for radio propagation modeling," Vehicular Technology, IEEE Transactions on , vol. 49, No. 6, pp. 2089-2104, Nov. 2000 doi: 10.1109/25.901880 URL: http://ieeexplore.ieee.org/stamp/stamp.jsp?tp=&arnumber=90188.*
Free Space Path Loss Friis Equation (http://www.rfcafe.com/references/electrical/path-loss.htm) Archived version from Feb. 24, 2009.*
Fernando Aguado Agelet et al., "Efficient Ray-Tracing Acceleration Techniques for Radio Propagation Modeling", IEEE Transactions on Vehicular Tech, vol. 49 No. 6, pp. 2089-2104, Nov. 2000.

* cited by examiner

*Primary Examiner* — Xiao M. Wu
*Assistant Examiner* — Phi Hoang
(74) *Attorney, Agent, or Firm* — Rabin & Berdo, P.C.

(57) ABSTRACT

A method for 3D preprocessing for ray tracing includes: selecting and storing visible surfaces by designating one of a plurality of structures as a reference structure and remaining structures as relative structures, searching for the relative structures from the reference structure, storing relative structures having a surface visible from the reference structure, and removing relative structures having an invisible surface; conducting selection and storage based on distance measurement by measuring the distance from the reference structure to each of the stored relative structures and removing relative structures positioned beyond a reference spot predetermined with reference to the reference structure; and calculating a ray propagation path by calculating the propagation path of the ray between the reference structure and each of the relative structures stored in said conducting selection and storage based on distance measurement.

6 Claims, 2 Drawing Sheets

METHOD FOR 3D PREPROCESSING FOR RAY TRACING

CROSS-REFERENCE(S) TO RELATED APPLICATIONS

The present application claims priority of Korean Patent Application No. 10-2009-0103437, filed on Oct. 29, 2009, which is(are) incorporated herein by reference in its entirety.

BACKGROUND OF THE INVENTION

1. Field of the Invention

Exemplary embodiments of the present invention relate to a ray tracing method; and, more particularly, to a method for conducting 3D preprocessing for ray tracing so that 3D ray tracing simulation, which is used to predict radio propagation characteristics, is performed efficiently at an improved analysis speed.

2. Description of Related Art

Current telecommunication systems subdivide the coverage into a number of cells, each of which is allocated different frequencies to reduce interference with neighboring cells. Cells are largely divided into two types: macrocells and microcells. Macrocells cover areas having a radius of a number of kilometers or tens of kilometers, and it is theoretically impossible to model many propagation obstacles within the macrocells. This means that radio propagation characteristics cannot be determined but by statistical prediction methods based on experiments.

Microcells, in contrast, have a cell radius of 1 km or less, and it is possible to mathematically model various buildings, which are typical propagation obstacles within the cells, and to theoretically predict the path loss of radio waves. Specifically, the soaring number of telecommunication service subscribers in urban areas is making it more and more important to develop models to predict radio propagation characteristics in microcells.

It has also been requested in line with the recent increase in the number of personal telecommunication subscribers to study radio propagation characteristics in microcells/picocells, which have a radius of 200-500 m, and to develop relevant models. Radio propagation characteristics in microcell/picocell systems have major differences, compared with current macrocells and quasi-macrocells, including low transmission antennas, low-level transmission output power, limitation of radio propagation distance imposed by buildings around transmission stations, and possibility of numerical modeling of propagation obstacles within cells.

Such striking differences have the following result: Base station antennas are as tall as streetlights in microcells/picocells. In other words, they are lower than neighboring buildings. This causes severe attenuation. Furthermore, diffraction of radio waves by edges of buildings affects the receiving side to a larger extent than diffraction by rooftops.

Microcells/picocells in urban environments, which have cell radius of hundreds of meters, exhibit widely varied propagation characteristics depending on the structure. In other words, the size and material of buildings, shape and width of roads, traffic, etc., all of which constitute the cell structure, vary the propagation environments (i.e. site-specific). Therefore, there exists a need for models for more precise prediction in microcells/picocells, and such models are commonly based on ray tracing.

The ray tracing refers to a technique of tracing the path of rays reaching mobile stations to extract the received power, rms delay time spread, etc., which are crucial to wireless network design.

Ray tracing techniques include an approach based on image theory, an approach based on ray launching, and an approach combining both of them. The approach based on image theory requires a short calculation time, but makes it difficult to extend the prediction structure. The approach based on ray launching enables extension of the prediction structure, but requires a long calculation time and has poor prediction accuracy.

Therefore, it is necessary to select a suitable ray tracing method based on cell structures constituting the propagation environments. However, conventional approaches have limitation in that the number of necessary calculations increases in proportion to the number of structures, and the analysis of simulation to predict propagation characteristics becomes slower noticeably.

Specifically, the prediction method based on ray launching uses actual building data to calculate every propagation path possible, and the resulting propagation model is very accurate. However, prediction of every propagation path possible is limited, and it takes a long time to predict as many propagation paths as possible.

Therefore, there is a need for more efficient analysis at a higher speed in connection with ray tracing in urban environments, where the complexity of ray tracing increases in proportion to the number of structures.

SUMMARY OF THE INVENTION

An embodiment of the present invention is directed to a method for conducting 3D preprocessing for ray tracing so as to improve the efficiency and speed of ray tracing in urban environments, where the complexity of ray tracing is on the increase.

Another embodiment of the present invention is directed to a method for conducting 3D processing for ray tracing in such a manner that, even if the transmission point changes its position, there is no repeat of the preprocessing process as in the case of conventional methods, thereby improving the efficiency and speed.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention a method for 3D preprocessing for ray tracing includes: selecting and storing visible surfaces by designating one of a plurality of structures as a reference structure and remaining structures as relative structures, searching for the relative structures from the reference structure, storing relative structures having a surface visible from the reference structure, and removing relative structures having an invisible surface; conducting selection and storage based on distance measurement by measuring the distance from the reference structure to each of the stored relative structures and removing relative structures positioned beyond a reference spot predetermined with reference to the reference structure; and calculating a ray propagation path by calculating the propagation path of the ray between the reference structure and each of the relative structures stored in said conducting selection and storage based on distance measurement.

The relative structures stored in said selecting and storing visible surfaces may include relative structures having a surface entirely visible from the reference structure or relative structures having a surface partially visible from the reference structure.

In said conducting selection and storage based on distance measurement, the reference spot may be a predetermined value of basic transmission loss in free space.

Said calculating a ray propagation path may include: storing information regarding the position of a vertex of a surface of the reference structure and information regarding the position of a vertex of a surface of a relative structure selected from the relative structures stored in said conducting selection and storage based on distance measurement; defining a coordinate vector as extending from a vertex of a surface of the reference structure to a vertex of a surface of the selected relative structure, converting the coordinate vector into spherical coordinate values $\theta$ and $\phi$ and storing the spherical coordinate values $\theta$ and $\phi$; selecting greatest and smallest values from the stored $\theta$ and $\phi$ values and storing the greatest and smallest values; and calculating a ray tracing path from the stored greatest $\theta$ and $\phi$ values and the smallest $\theta$ and $\phi$ values.

In said calculating a ray propagation path, when the propagation path of a ray reflected by a surface of the reference structure lies within a range between the greatest $\theta$ and $\phi$ values and the smallest $\theta$ and $\phi$ values, it may be determined that a relative structure exists in the propagation path of the ray.

In said calculating a ray propagation path, when the propagation path of a ray reflected by a surface of the reference structure does not lie within a range between the greatest $\theta$ and $\phi$ values and the smallest $\theta$ and $\phi$ values, it may be determined that the ray has not hit the reference structure.

The information regarding the position of a vertex of a surface of the reference structure and the information regarding the position of a vertex of a surface of a relative structure selected from the relative structures stored in said conducting selection and storage based on distance measurement may be Cartesian coordinates.

DESCRIPTION OF SPECIFIC EMBODIMENTS

Figure 1:
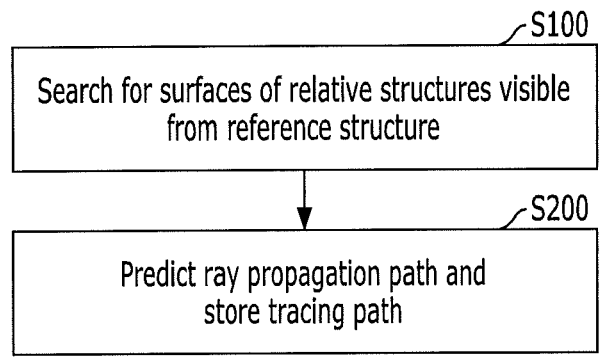
FIG. 1 is a flowchart showing steps of a method for 3D preprocessing for ray tracing in accordance with an embodiment of the preset invention.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a flowchart showing steps of a method for 3D preprocessing for ray tracing in accordance with an embodiment of the preset invention. A method for 3D preprocessing for ray tracing in accordance with the present invention will now be described in detail with reference to FIG. 1. The method begins by a process of selecting and storing visible surfaces. Specifically, nearby relative structures are searched for to determine if any surface of the relative structures is visible from the position of a transmission point or reference structure at step S100.

In the process of selecting and storing visible surfaces, relative structures having visible surfaces are stored, and other relative structures (i.e. having no visible surfaces) are removed.

A process of selection and storage based on distance measurement is then conducted by measuring the distance to the relative structures, which have been found and stored in the process of selecting and storing visible surfaces, and removing relative structures considered unnecessary. The process of selection and storage based on distance measurement will now be described in more detail: One is arbitrarily selected from the relative structures stored in the process of selecting and storing visible surfaces, and is designated as a reference structure. Other relative structures having visible surfaces are stored. The distance is then measured. Based on the measured distance, relative structures lying between the reference structure and a predetermined reference spot are stored, and those lying beyond are removed. The reference spot may be determined by, for example, using basic transmission loss in free space, the value of which is selected by user selection. For example, the user may designate a spot having a value of basic transmission loss in free space of 100 dB as the reference spot so that relative structures lying between the reference structure and the reference spot are stored, and those lying beyond are removed. As such, use of the value of basic transmission loss in free space determines whether to store or remove each relative structure.

This process reduces analysis time because not the entire structures, but a smaller number of selected structured are analyzed.

In order to calculate the path of rays propagating to the relative structures, which have been finally stored in the process of selection and storage based on distance measurement, prepared software is used to map the relative structure and the finally stored relative structures into a virtual spatial domain at step S200. This is for the purpose of avoiding a repeat of ray tracing regardless of the position of the transmission point or the reference structure.

Figure 2:
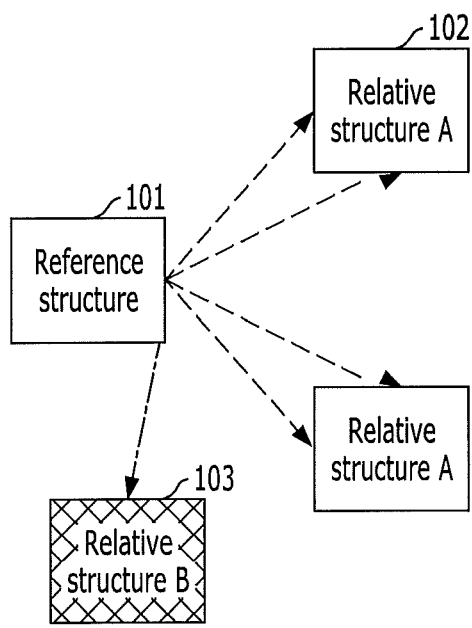
FIG. 2 illustrates the step of searching for surfaces of relative structures visible from a reference structure of the method shown in FIG. 1.

FIG. 2 illustrates the step of searching for surfaces of relative structures visible from a reference structure of the method shown in FIG. 1. The process of selecting and storing visible surfaces of the method shown in FIG. 1 will now be described in more detail with reference to FIG. 2.

As shown in FIG. 2, one is arbitrarily selected from the entire structures and is designated as a reference structure 101 to determine if each relative structure is visible from the reference structure 101. If a relative structure has an entire surface visible from the reference structure 101, as in the case of relative structure A 102, it is considered having a visible surface. If a relative structure has a surface partially visible from the relative structure 101, as in the case of relative structure B 103, it is also considered having a visible surface. All relative structures having visible surfaces are stored, and the remaining relative structures are considered having no visible surface and are removed.

Figure 3:
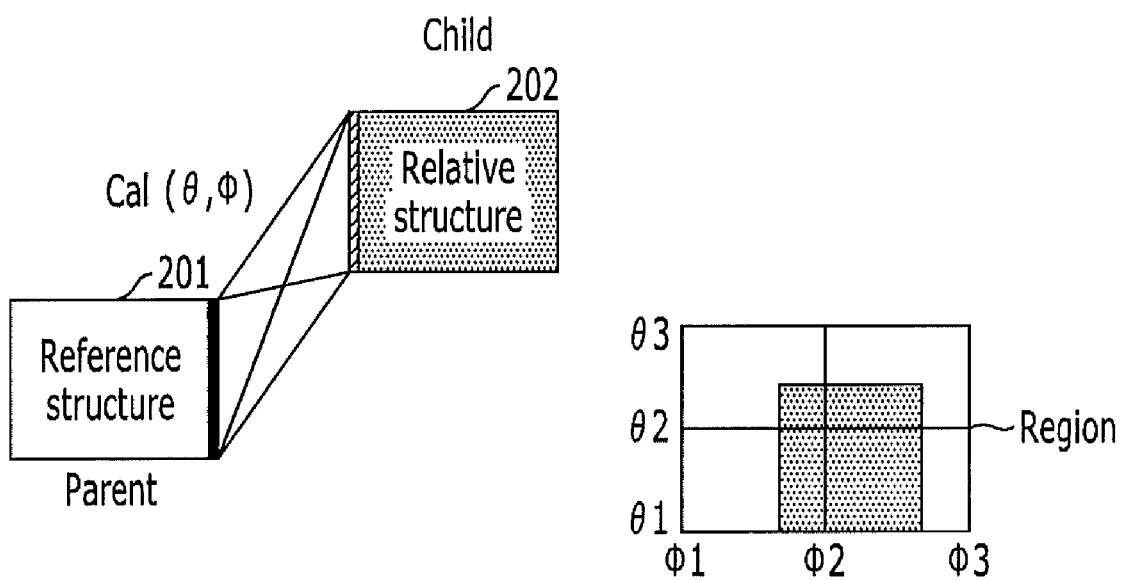
FIG. 3 illustrates the step of calculating ray propagation paths in advance and storing tracing paths of the method shown in FIG. 1.

FIG. 3 illustrates the step S200 of calculating ray propagation paths in advance and storing tracing paths of the method shown in FIG. 1. The step S200 of the method shown in FIG. 1 will now be described in more detail with reference to FIG. 3.

At step S200, the path of rays propagating to the finally stored relative structures is calculated in advance, and relative structures in the ray propagation direction are determined.

The step S200 will now be subdivided and described separately. Firstly, the reference structure 201 is designated as a parent node, and an arbitrary relative structure 202 is designated as a child node.

Secondly, information regarding the position (Cartesian coordinates) of vertices (three, in the case of a triangle) of a surface of the reference structure 201 is stored, and information regarding the position (Cartesian coordinates) of vertices (three, in the case of a triangle) of a surface of the relative structure 202 is stored.

Thirdly, a coordinate vector (Cartesian coordinates) is defined as extending from a vertex of a surface of the reference structure 201 to a vertex of a surface of the relative structure 202. The coordinate vector is converted into spherical coordinate values $\theta$ and $\phi$, which are stored. Assuming that the reference and relative structures 201 and 202 have triangular surfaces, a total of nine $\theta$ and $\phi$ values are obtained by similarly connecting all vertices. Alternatively, assuming that the reference and relative structures 201 and 202 have quadrilateral surfaces, a total of sixteen $\theta$ and $\phi$ values are obtained by similarly connecting all vertices.

Fourthly, the greatest and smallest values are selected from the stored nine $\theta$ and $\phi$ values and stored. The calculated greatest $\theta$ and $\phi$ values and the smallest $\theta$ and $\phi$ values are used to predict the ray tracing path.

Specifically, it is determined that, if a ray has been reflected by a surface of the reference structure 201, the possible propagation path of the reflected ray lies in the range between the greatest $\theta$ and $\phi$ values and the smallest $\theta$ and $\phi$ values calculated above. This means that, outside the same range, a ray reflected by a surface of the reference structure 201 passes through a surface of the relative structure 202 without hitting it. Furthermore, it is expected that, if the propagation path of the reflected ray lies between the range of the calculated greatest and smallest values, a relative structure exits in the propagation path of the ray.

In accordance with the exemplary embodiment of the present invention, the method for 3D preprocessing for ray tracing avoids a repeat of the preprocessing process even if the position of the transmission point varies with regard to the same structure, unlike conventional methods. This guarantees more efficient analysis, and improves the ray tracing speed. The method can analyze propagation models regarding urban propagation environments in a more rapid and efficient manner. The method can predict the ray tracing path in a more rapid and efficient manner. The method can predict the existence of a relative structure in the ray propagation path.

The invention can also be embodied as computer readable codes on a computer-readable storage medium. The computer-readable storage medium is any data storage device that can store data which can be thereafter read by a computer system. Examples of the computer-readable storage medium include ROMs, RAMs, CD-ROMs, DVDs, magnetic tapes, floppy disks, registers, buffers, optical data storage devices, and carrier waves (such as data transmission through the Internet). The computer-readable storage medium can also be distributed over network coupled computer systems so that the computer readable codes are stored and executed in a distributed fashion. Also, functional programs, codes, and code segments for accomplishing the present invention can be easily construed by programmers skilled in the art to which the present invention pertains.

While the present invention has been described with respect to the specific embodiments, it will be apparent to those skilled in the art that various changes and modifications may be made without departing from the spirit and scope of the invention as defined in the following claims.

What is claimed is:

1. A method for 3D preprocessing for ray tracing, comprising:
    selecting and storing visible surfaces by designating one of a plurality of structures as a reference structure and remaining structures as relative structures, searching for the relative structures from the reference structure, storing relative structures having a surface visible from the reference structure, and removing relative structures having an invisible surface;
    conducting selection and storage based on distance measurement by measuring a distance from the reference structure to each of the stored relative structures and removing relative structures positioned beyond a reference spot predetermined with reference to the reference structure; and
    calculating a ray propagation path by calculating the propagation path of the ray between the reference structure and each of the relative structures stored in said conducting selection and storage based on distance measurement;
    wherein said calculating a ray propagation path comprises:
    storing information regarding a position of a vertex of a surface of the reference structure and information regarding a position of a vertex of a surface of a relative structure selected from the relative structures stored in said conducting selection and storage based on distance measurement;
    defining a coordinate vector as extending from a vertex of a surface of the reference structure to a vertex of a surface of the selected relative structure, converting the coordinate vector into spherical coordinate values $\theta$ and $\phi$ and storing the spherical coordinate values $\theta$ and $\phi$;
    selecting greatest and smallest values from the stored $\theta$ and $\phi$ values and storing the greatest and smallest values; and
    calculating a ray tracing path from the stored greatest $\theta$ and $\phi$ values and the smallest $\theta$ and $\phi$ values.

2. The method of claim 1, wherein said selecting and storing visible surfaces comprises storing relative structures having a surface entirely visible from the reference structure or relative structures having a surface partially visible from the reference structure.

3. The method of claim 1, wherein said conducting selection and storage based on distance measurement comprises referring to a predetermined value of basic transmission loss in free space as the reference spot.

4. The method of claim 1, wherein in said calculating a ray propagation path, based at least partly on the propagation path of a ray being reflected by a surface of the reference structure that lies within a range between the greatest $\theta$ and $\phi$ values and the smallest $\theta$ and $\phi$ values, it is determined that a relative structure exists in the propagation path of the ray.

5. The method of claim 1, wherein in said calculating a ray propagation path, based at least partly on the propagation path of a ray being reflected by a surface of the reference structure that does not lie within a range between the greatest $\theta$ and $\phi$ values and the smallest $\theta$ and $\phi$ values, it is determined that the ray has not hit the reference structure.

6. The method of claim 1, further comprising expressing the information regarding the position of a vertex of a surface of the reference structure and the information regarding the position of a vertex of a surface of a relative structure selected from the relative structures stored in said conducting selection and storage based on distance measurement as Cartesian coordinates.

* * * * *